(12) United States Patent
Knox et al.

(10) Patent No.: US 6,769,600 B1
(45) Date of Patent: Aug. 3, 2004

(54) MOTOR LAMINATION NOTCHING APPARATUS AND METHOD WITH SELECTIVELY POSITIONABLE PUNCHES

(75) Inventors: Roger E. Knox, Kettering, OH (US); John William Murphy, Kettering, OH (US)

(73) Assignee: Dayton-Phoenix Group, Inc., Dayton, OH (US)

( * ) Notice: Subject to any disclaimer, the term of this patent is extended or adjusted under 35 U.S.C. 154(b) by 313 days.

(21) Appl. No.: 09/829,726

(22) Filed: Apr. 10, 2001

Related U.S. Application Data

(60) Provisional application No. 60/212,314, filed on Jun. 16, 2000.

(51) Int. Cl.[7] .................................................. B26F 1/04
(52) U.S. Cl. ............................ 234/98; 83/549; 83/733
(58) Field of Search ....................... 234/97, 98; 83/549, 83/687, 691, 733, 410.9, 439

(56) References Cited

U.S. PATENT DOCUMENTS

| | | | | |
|---|---|---|---|---|
| 570,729 A | | 11/1896 | Graham | |
| 1,485,168 A | | 2/1924 | Cooper | |
| 1,788,023 A | * | 1/1931 | Hochreiner | 83/698.91 |
| 2,185,685 A | * | 1/1940 | Blakely | 234/94 |
| 3,107,566 A | | 10/1963 | Archer | |
| 3,110,831 A | | 11/1963 | Zimmerle | |
| 3,202,851 A | | 8/1965 | Zimmerle et al. | |
| 3,225,424 A | | 12/1965 | Wiley | |
| 3,834,013 A | | 9/1974 | Gerstle | |
| 4,096,774 A | * | 6/1978 | Kaufmann | 83/691 |
| 4,110,895 A | * | 9/1978 | Mitsui | 29/598 |
| 4,480,782 A | * | 11/1984 | Morishima | 234/98 |
| 4,555,966 A | * | 12/1985 | Klingel | 83/549 |
| 4,569,267 A | * | 2/1986 | Klingel | 83/549 |
| 4,578,853 A | | 4/1986 | Würth | |
| 4,619,028 A | | 10/1986 | Neuenschwander | |
| 4,728,842 A | | 3/1988 | Martin | |
| 4,802,393 A | * | 2/1989 | Gruchalski et al. | 83/690 |
| 5,044,237 A | | 9/1991 | Frame | |
| 5,215,513 A | * | 6/1993 | Maynard et al. | 83/552 |
| 5,269,739 A | * | 12/1993 | Maynard et al. | 83/549 |
| 5,463,922 A | * | 11/1995 | Mori | 83/588 |
| 5,551,142 A | | 9/1996 | Kooken et al. | |
| 5,797,306 A | * | 8/1998 | Kufahl | 83/733 |
| 5,842,398 A | * | 12/1998 | Jenkins et al. | 83/687 |
| 5,845,553 A | | 12/1998 | Kooken et al. | |
| 6,435,395 B1 | * | 8/2002 | Miyaguchi et al. | 83/86 |
| 2001/0011492 A1 | * | 8/2001 | Fukumoto et al. | 83/549 |

* cited by examiner

Primary Examiner—Allan N. Shoap
Assistant Examiner—Jason Prone
(74) Attorney, Agent, or Firm—Thompson Hine LLP

(57) ABSTRACT

A notching apparatus for notching both an outer lamination and an inner lamination from a single lamination blank at s single station using a single press device includes a multi-piece die assembly provides multiple outer slot punches, multiple inner slot punches, and a separator punch. The outer slot punch portion, inner slot punch portion, and separator punch portion of the multi-piece die assembly are all selectively positionable in respective punching positions and non-punching positions to facilitate a controlled notching operation.

17 Claims, 4 Drawing Sheets

MOTOR LAMINATION NOTCHING APPARATUS AND METHOD WITH SELECTIVELY POSITIONABLE PUNCHES

CROSS REFERENCES

This application claims the benefit of provisional patent application Serial No. 60/212,314 filed Jun. 16, 2000, the entire specification of which is incorporated herein by reference.

TECHNICAL FIELD

The present invention relates generally to punch press type machines used for notching motor laminations, and more particularly, to an apparatus for stamping rotor and stator laminations from a single lamination blank.

BACKGROUND

Typically, large electric motors include a cylindrical stator core which is comprised of a stack of relatively thin annular laminations, made of a conductive metal, which surrounds an inner rotor core. Slots are stamped radially from the center of the outer lamination and lined up when built up into a stack of laminations. After these laminations are lined up, the stack of laminations are permanently locked together by welding, riveting, cleating or something similar. These slots are then insulated and copper wires are secured inside. Alignment of the lamination slots is critical at this point because misalignment of adjoining laminations and their slots creates a raided edge. This rased edge can cut through the slot insulation, during the insertion of the copper wires, and cause the copper wires to come in contact with the stator core. This will cause a ground fault in the stator assembly. Similarly, slots are stamped radially in an inner lamination. These laminations are built into a stack or rotor core and permanently locked together in a way similar to the outer stack.

Typically, the slots in the laminations are stamped in the stator or outer lamination and separated from a blank lamination. Then the leftover blank has slots stamped in it to produce the rotor or inner lamination. Depending on volume to be produced, these two operations are performed on two different machines with two different operators. With lower volumes, the procedure still requires two operations. The use of two different machines and operators involves a substantial increase in manufacturing time and expense.

An exemplary stator lamination jig system is disclosed in U.S. Pat. No. 5,551,142, the disclosure of which is incorporated herein by reference.

Accordingly, it would be desirable and advantageous to provide an improved slot stamping apparatus to provide a finished inner lamination and a finished outer lamination from a single lamination blank.

SUMMARY

In one aspect, a notching apparatus for notching an outer lamination and an inner lamination from a single lamination blank includes a drive arbor for positioning the lamination blank thereon and an indexing mechanism coupled with the drive arbor for consistent indexing of the lamination blank. A punch station is positioned for having the lamination blank move thereby and includes a punch press and a multi-piece punch and die assembly. The multi-piece punch dies assembly includes an outer slot punch portion, an inner slot punch portion and a separator punch portion. The outer slot punch portion, the inner slot punch portion, and the separator punch portion are each positionable in respective punching positions and non-punching positions. A controller is connected for controlling operation of the press, the indexing mechanism and positioning of the outer slot punch portion, the inner slot punch portion and the separator punch portion. During a notching operation the controller effects the following operations: (a) position one of the outer slot punch portion and the inner slot punch portion in its respective punching position and positioning the other of the outer slot punch portion and the inner slot punch portion in its respective non-punching position; (b) rotate the lamination blank past the punch station in a series of indexing steps through a first rotation; (c) repeatedly engage the lamination blank with the multi-piece punch and die assembly as the lamination blank is rotated through the first rotation forming a first pattern of spaced notches in the lamination blank; (d) reverse the punching/non-punching positions of the outer slot punch portion and the inner slot punch portion; (e) rotate the lamination blank past the punch station in a series of indexing steps through a second rotation; (f) repeatedly engage the lamination blank with the multi-piece punch and die assembly as the lamination blank is rotated through the second rotation forming a second pattern of spaced notches in the lamination blank; and (g) position the separator punch portion in the punching position during one of the first rotation and the second rotation for separating the lamination blank into the inner lamination and the outer lamination; and wherein the first pattern of spaced notches is formed in one of the inner lamination and the outer lamination and the second pattern of spaced notches is formed in the other of the inner lamination and the outer lamination. The subject notching apparatus separates the lamination blank into the inner lamination and the outer lamination as the notches are stamped in one of laminations in one rotation and stamps the notches in the other of the laminations in another rotation, also providing improved manufacturing speed and reduced manufacturing cost.

DETAILED DESCRIPTION

Figure 1:
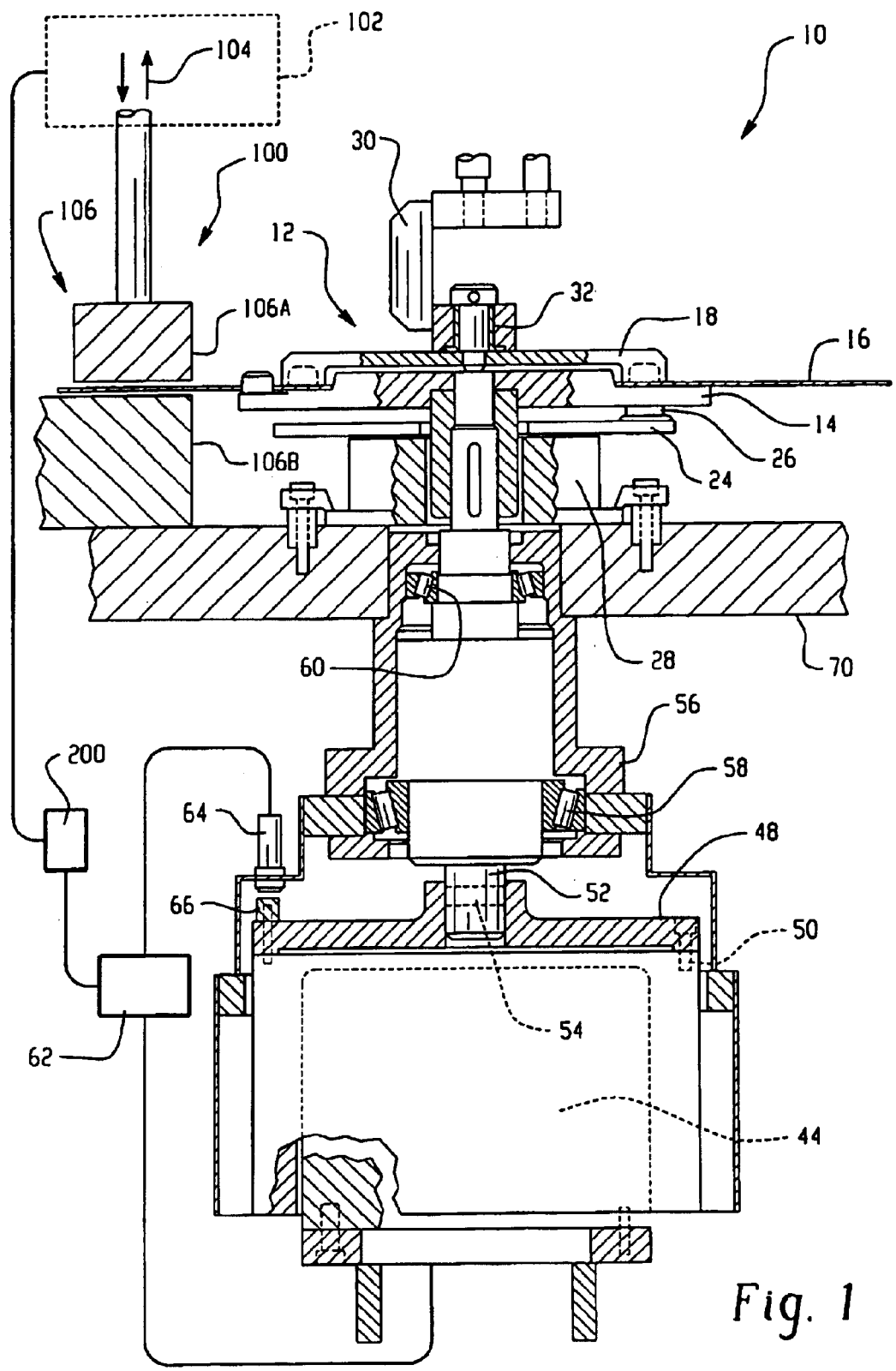
FIG. 1 is an elevation, partial cross-section of one embodiment of a notching apparatus for use with the present invention.

Referring to drawing FIG. 1, a partial depiction of an exemplary indexing apparatus 10 attached to a mechanical device 102, usually a punch press, to supply the necessary forces to apply the punch and die assembly 106 to cut the slots in the lamination 16 is shown. In particular, one part of assembly 12 includes a driving arbor 14 for supporting a lamination 16 thereon. The lamination 16 extends over the edge of the arbor 14 as shown. An extending and retracting circular cap 18 holds the lamination 16 on the drive arbor 14 from the top. The assembly 12 also includes a fixture comprised of an air cylinder 28, cylindrical shaped plugs 26, and a circular plate 24. This sub assembly removes the lamination 16 from the tight fitting driving arbor 14 at the end of the stamping cycle by applying air to the cylinder 28. This causes an upward motion of the plate 24 and the plugs 26, thereby removing the lamination 16 from the arbor 14. A bracket assembly 30, including a bushing and shoulder screw assembly 32, allows the cap 18 to rotate with the lamination 16 while holding it securely to the arbor 14. The arbor 14 is attached to a drive shaft 52 which is housed in bearing housing 56. To eliminate any eccentric rotation of shaft 52, tapered roller bearings 58 and 60 are placed in the bearing housing 56. The lower portion of the shaft 52 is pinned 54 to a motor mounting cap 48. The cap 48 is bolted 50 to a servo motor 44. A programmable servo controller 62 controls the speed of indexing and positioning of the motor 44 through the use of sensors 64, alignment buttons 66, and internal commands within the program. This information could be checked if the servo motor used has an internal encoder. The servo motor 44 and the programmable servo controller 62 used in this application divides a 360 degree rotation into 1,024,000 different positions or "counts". A servo motor and controller with more or less counts in a 360 degree rotation could be used. This generally depends on the accuracy needed in indexing. Not depicted in FIG. 1 is a slot machined into the bolster plate 70 and a clamping device to allow for changes in the radius from centerline of the lamination 16 to centerline of the slots to be stamped. The advantage of using a direct drive system over using a gear drive system would be that there is no chance of seeing gear backlash. With the constant acceleration and deceleration of the arbor 14 to move into position and stop while stamping the part, gear backlash increase with wear. This results in uncontrolled positioning of the slots that are stamped.

Not depicted in the drawings are a resolver, a device that measures position of the press crankshaft as it travels in a 360 degree rotation and equals one stroke of the press, an electronic counting device which keeps track of how many times the press reaches the top of the stroke by a signal that is received from the resolver, and an electrically powered air solenoid. The punch station 100 is positioned to have the lamination blank 16 move thereby during rotation. The punch station 100 includes a punch press 102 which operates in an up and down manner as indicated by arrows 104. The exact construction of the punch press may be selected from among the many known in the art. A multi-piece punch and die assembly 106 is also provided at the punch station 100, including upper portion 106A and lower portion 106B. The punch press 100 operates to move the upper portion 106A downward to engage the lamination blank 16 and to perform a punch or stamp operation on the lamination.

Figure 2:
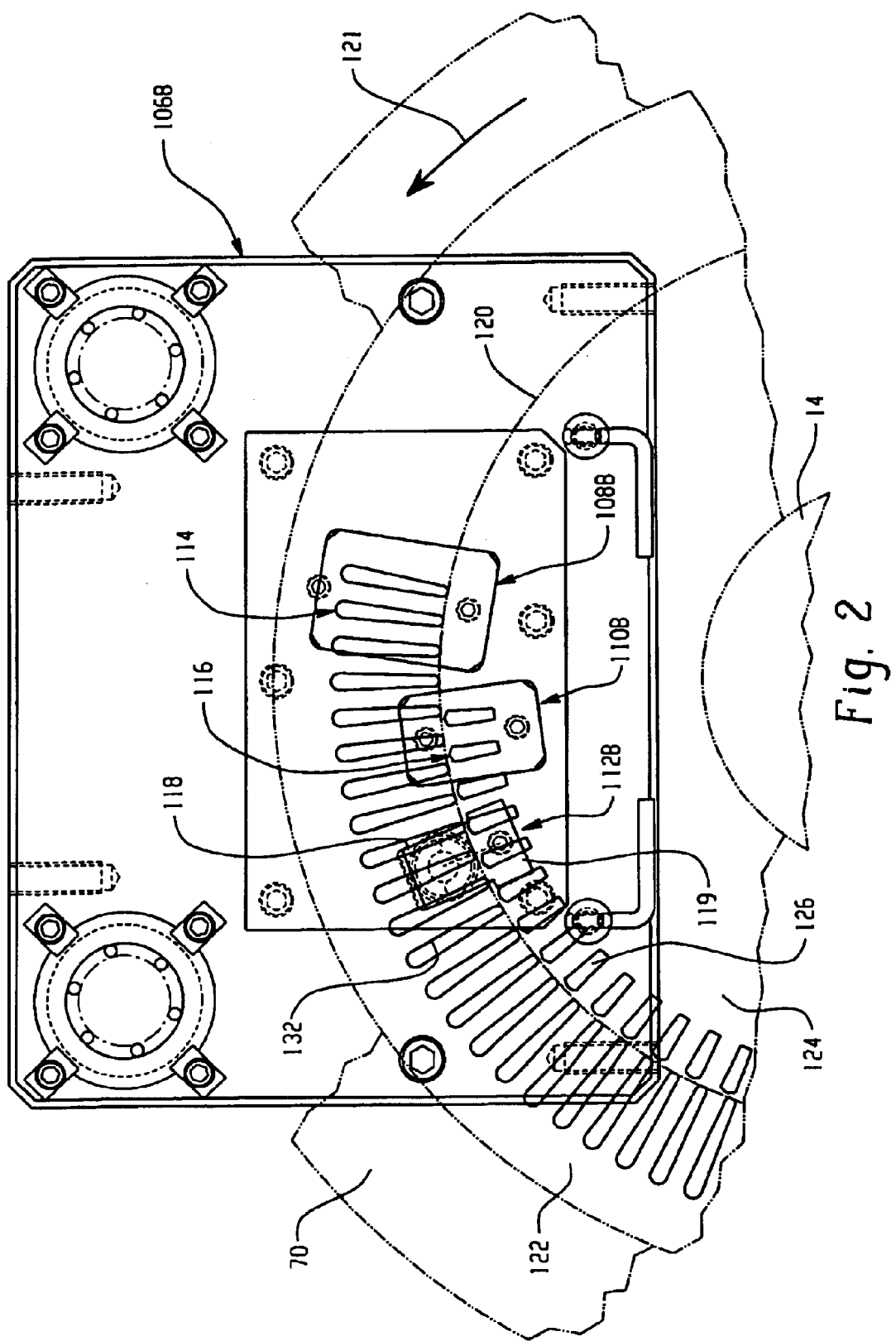
FIG. 2 is a top view of a lamination blank moving past a lower portion of a punch and die assembly in accordance with one embodiment of the invention.

An upper view of the lamination 16 as it moves past the punch station 100 is depicted in FIG. 2. The lower portion 106B of the multi-piece punch die and assembly is shown and includes an outer slot punch portion 108B, an inner slot punch portion 110B and a separator punch portion 112B. The slot punch portions are formed by slot die plates and separator punch portion 112B includes a separator die plate 119. Each portion may be circumferentially spaced from the others to distribute mechanical stresses caused by impact forces. In the illustrated embodiment each of the outer slot punch portion 108B and the inner slot punch portion 110B include a plurality of respective punch receiving slots 114 and 116. These slots 114 and 116 are aligned with the punches of the upper portion 106A which engage the upper surface of the lamination blank 16 during a notching operation. The separator punch portion 112B includes a spring-loaded pad 118 to allow clearance for the outer lamination during separation from the inner lamination, which separation occurs along a circumferential path 120. Counter-clockwise rotation of the lamination blank 16 is depicted by arrow 121. Slots 126 are produced in inner lamination 124 and slots 132 are produced in outer lamination 122.

Figure 3:
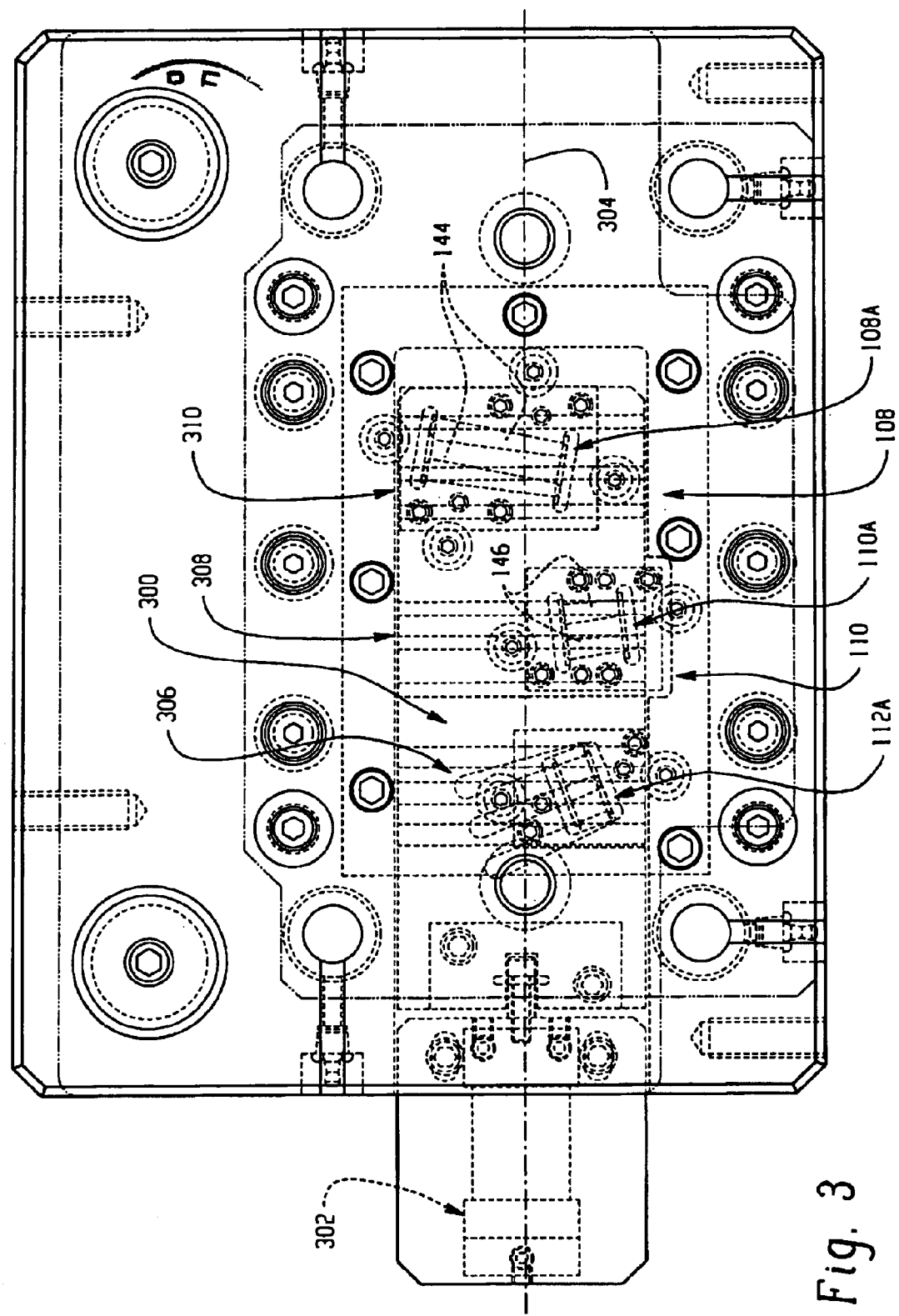
FIG. 3 is a top view of the upper portion of the punch and die assembly.
Figure 4:
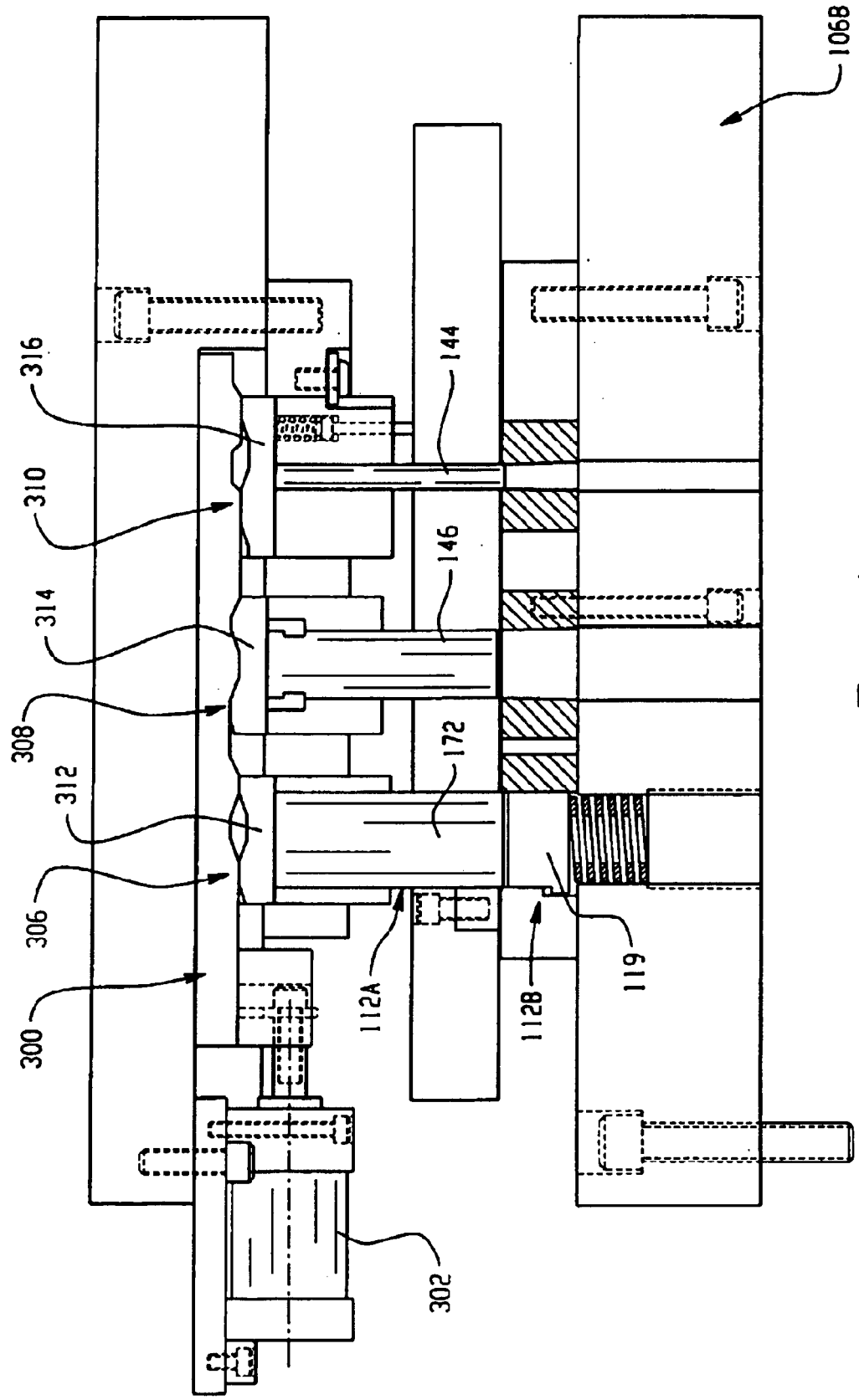
FIG. 4 is a side elevation view of the punch and die assembly.

Referring to FIGS. 3 and 4, the upper portion 106A of the punch and die assembly includes outer slot punch portion 108A, inner slot punch portion 110A and separator punch portion 112A. A die shoe and separator plate are provided. Portion 108A includes punches 144 and portion 110A includes punches 146. A cam member 300 is provided at the top of upper portion 106A and is movable along a left to right axis 304 via pressure control of an air cylinder 302. The lower side of cam member 300 includes multiple cam surface regions 306, 308, 310 for contacting the upper surface of separator punch 172, inner slot punches 146 and outer slot punches 144 respectively. Thus, by controlling pressurization of air cylinder 302 the position of cam member 300 is controlled and each of the separator punch, inner slot punches and outer slot punches can be moved between respective punching positions and non-punching positions. As best seen in FIG. 4, members 312, 314 and 316 are positioned at the top of each punch and include cam surfaces which correspondingly engage surface region 306, 308 and 310 to cause the punches to move from punching positions see punches 172 and 144 in which the lower surfaces of punches are capable of contacting and penetrating a lamination during a stamping operation, and non-punching positions (see punch 146) where the lower surfaces of the punches are raised so as to prevent them from contacting and penetrating the lamination during a stamping operation.

Utilizing this die assembly, the resulting notching apparatus enables the following notching method. By controlling the cam member 300, the punches of one of the outer slot punch portion 108 and the inner slot punch portion 110 are positioned in their respective punching positions and the punches of the other of the outer slot punch portion 108 and the inner slot punch portion 110 are positioned in their respective non-punching positions. The lamination blank 16 is then rotated past the punch station 100 in a series of indexing steps through a first rotation. The lamination blank 16 is repeatedly engaged with the multi-piece punch and die assembly 106 as the lamination blank 16 is rotated through the first rotation forming a first pattern of spaced notches in the lamination blank 16. The punching and non-punching positions of the punches of the outer slot punch portion 108 and the inner slot punch portion 110 are then reversed. The lamination blank 16 is then again rotated past the punch station 100 in a series of indexing steps through a second rotation. The lamination blank 16 is repeatedly engaged with the multi-piece punch and die assembly 106 as the lamination blank 16 is rotated through the second rotation forming a second pattern of spaced notches in the lamination blank 16. The punch of the separator punch portion 112A is positioned in the punching position during one of the first rotation and the second rotation for separating the lamination blank 16 into the inner lamination 124 and the outer lamination 122 and is located such that the first pattern of spaced notches is formed in one of the inner lamination 124 and the outer lamination 122 and the second pattern of spaced notches is formed in the other of the inner lamination 124 and the outer lamination 122.

In one embodiment, during the first rotation the punches 146 of the inner slot punch portion 110A are positioned in their punching positions and the punches 144 of the outer slot punch portion 108A are positioned in their non-punching positions and during the second rotation the punches 146 of the inner slot punch portion 110A are positioned in their non-punching positions and the punches 144 of the outer slot punch portion 108A are positioned in their punching positions. The separator punch 112A is also preferably positioned in its punching position during the second rotation. However, it is recognized that the positioning of the punches of the inner slot punch portion and outer slot punch portion during the first and second rotations could be reversed, and that the separator punch portion could be positioned in its punching position during the first rotation rather than the second rotation. The aforementioned positioning of the various portions of the multi-piece punch die assembly may be achieved using a suitably programmed electronic controller 200 connected to operate the air cylinder 302.

A more detailed explanation of one example of operation follows. After the operator places the lamination blank 16 on the drive arbor 14, the sequence is started for stamping slots. The lamination blank 16 will index in a counterclockwise motion 121 stopping to stamp slots 126 into where the finished inner lamination dimensions call for them to be. Since the punch and die assembly will stamp 2 slots at a time, the exact number of stamping strokes of the press to achieve the desired number of slots 126 stamped for the inner lamination will be 76/2=38. As the press stamps the slots 126 with the indexing system rotating the part over 360 degrees, a counter receives signals from the resolver. The programmed servo controller 62 (FIG. 1) rotates the servo motor 9.47368 degrees (first part of the program) with each stroke of the press.

When the counter reaches the number 38, a number of things change. A signal is sent from the counter to the air solenoid 302, the servo controller 62 goes into the second part of it's program, the counter resets to zero, and a new high limit number is entered into the counter automatically. This number is (96/2) or 48.

When the air solenoid is activated, air allowed to pass extends the shaft in the air cylinder 302 mounted to the upper half of the punch and die assembly 106. This air cylinder shaft moves cam 300 inside the punch assembly. During the stamping of the inner lamination slots 126, the cam and punch assembly had a stack up measurement that exceeded the dimension between the flat side of the cam 300 and the top of the lamination blank. This resulted in the stamping of the inner lamination slots 126. Since the cam 300 is moved after stamping of slots 126, the stack up measurement is decreased to the point where the inner lamination slots 126 will not be stamped. Also, after cam 300 is moved, the cam and punch assembly has a stack up measurement that causes the outer slots 132 to be stamped during the second 360° rotation. The cam 300 movement also causes the separation punch 172 to have a stack up measurement that exceeds the dimension between the flat side of the cam 300 and the top of the lamination blank. This results in the separation of the inner lamination 124 from the outer lamination 122 during the second 360° rotation.

The second part of the program in the programmable servo controller (FIG. 1) changes the degree of indexing of the servo motor from 9.47368 degrees (360 deg./(76 slots/2 punches)) to 7.50000 degrees (360 deg./(96 slots/2 punches)). This may be done internally in the controller's program without changing the punch press speed or strokes per minute.

The lamination blank 16 will continue to index in a counterclockwise motion in its second rotation, stopping to stamp slots 132 at the desired locations. At the same time separation of the inner and outer lamination takes place. In the illustrated embodiment, the exact number of strokes of the press to achieve the desired number of slots 132 stamped for the outer lamination will be 96/2=48. As the press stamps the slots 132 with the indexing system rotating the part over 360 degrees, the counter receives signals from the resolver. The programmed servo controller 62 rotates the servo motor 7.50000 degrees (second part of the program) with each stroke of the press.

When the counter reaches 48, a number of things change. The punch press stops cycling, the servo controller stops the movement of the servo motor, a signal is sent from the counter to the air solenoid, the servo controller goes back into the first part of it's program, the counter resets to zero, and a new high limit number is entered into the counter automatically. This number is (76/2) or 38. This same signal de-activates the air solenoid. Without air pressure to activate the air cylinder 302 an internal spring in the air cylinder causes the cylinder shaft to retract. The cam 300 also retracts and the stack up dimensions are again set so that the inner slots 126 will be stamped, but neither the outer slots 132 or separation line will be stamped, in preparation for the next lamination 16.

A loop in the program in the programmable servo controller sends the program back to the first part. This changes the degree of indexing of the servo motor from 7.50000 degrees (360 deg./(96 slots/2 punches)) to 9.47368 degrees (360 deg./(76 slots/2 punches)). At this point, the inner lamination and the outer lamination are removed from the machine, a new lamination blank is placed on the drive arbor, and the press is restarted.

Although the invention has been described and illustrated in detail it is to be clearly understood that the same is intended by way of illustration and example only and is not intended to be taken by way of limitation. Accordingly, the spirit and scope of the invention are to be limited only by the terms of the appended claims.

What is claimed is:

1. A method for notching an outer lamination and an inner lamination from a single lamination blank, comprising:
    (a) providing a single punch station;
    (b) providing a punch and die assembly including an outer slot punch portion, an inner slot punch portion, and a separator punch portion, wherein the outer slot punch portion, the inner slot punch portion, and the separator punch portion are each positionable in respective punching positions and non-punching positions;
    (c) positioning one of the outer slot punch portion and the inner slot punch portion in its respective punching position and positioning the other of the outer slot punch portion and the inner slot punch portion in its respective non-punching position;
    (d) rotating the lamination blank past the punch station in a series of indexing steps through a first rotation;
    (e) repeatedly engaging the lamination blank with the punch and die assembly as the lamination blank is rotated through the first rotation forming a first pattern of spaced notches in the lamination blank;
    (f) reversing the punching and non-punching positions of the outer slot punch portion and the inner slot punch portion;
    (g) rotating the lamination blank past the punch station in a series of indexing steps through a second rotation;
    (h) repeatedly engaging the lamination blank with the multi-piece punch and die assembly as the lamination blank is rotated through the second rotation forming a second pattern of spaced notches in the lamination blank;
    (i) positioning the separator punch portion in the punching position during one of the first rotation and the second rotation for separating the lamination blank into the inner lamination and the outer lamination; and wherein the first pattern of spaced notches is formed in one of the inner lamination and the outer lamination and the second pattern of spaced notches is formed in the other of the inner lamination and the outer lamination.

2. The method of claim 1 wherein in step (c) the inner slot punch portion is positioned in its punching position and the outer slot punch portion is positioned in its non-punching position, and in step (f) the inner slot punch portion is positioned in its non-punching position and the outer slot punch portion is positioned in its punching position.

3. The method of claim 2 wherein step (i) includes positioning the separator punch in its punching position during the first rotation.

4. The method of claim 2 wherein step (i) includes positioning the separator punch in its punching position during the second rotation.

5. The method of claim 1 wherein in step (c) the inner slot punch portion is positioned in its non-punching position and the outer slot punch portion is positioned in its punching position, and in step (f) the inner slot punch portion is positioned in its punching position and the outer slot punch portion is positioned in its non-punching position.

6. The method of claim 5 wherein step (i) includes positioning the separator punch in its punching position during the first rotation.

7. The method of claim 5 wherein step (i) includes positioning the separator punch in its punching position during the second rotation.

8. A method for notching an outer lamination and an inner lamination from a single lamination blank, comprising:

(a) providing a single punch station;

(b) providing a punch and die assembly including an outer slot punch portion and an inner slot punch portion, wherein the outer slot punch portion and the inner slot punch portion are each positionable in respective punching positions and non-punching positions;

(c) positioning one of the outer slot punch portion and the inner slot punch portion in its respective punching position and positioning the other of the outer slot punch portion and the inner slot punch portion in its respective non-punching position, and performing a first series of punching operations on a lamination blank forming a first pattern of spaced notches in the lamination blank;

(d) reversing the punching and non-punching positions of the outer slot punch portion and the inner slot punch portion, and performing a second series of punching operations on the lamination blank forming a second pattern of spaced notches in the lamination blank;

wherein the first pattern of spaced notches is formed in a portion of the lamination blank corresponding to one of an inner lamination and an outer lamination and the second pattern of spaced notches is formed in a portion of the lamination blank corresponding to the other of the inner lamination and the outer lamination.

9. The method of claim 8 wherein relative rotational movement occurs between the lamination blank and the punch and die assembly during the first series of punching operations and during the second series of punching operations.

10. The method of claim 8 wherein the punch and die assembly further includes a separator punch portion positionable in both a punching position and a non-punching position, the method further includes positioning the separator punch portion into its punching position during at least one of step (c) and step (d).

11. The method of claim 10 wherein the separator punch is in its punching position during the first series of punching operations and is in its non-punching position during the second series of punching operations.

12. The method of claim 10 wherein the separator punch is in its punching position during the second series of punching operations and is in its non-punching position during the first series of punching operations.

13. A method for notching an outer lamination and an inner lamination from a single lamination blank, comprising:

(a) providing a single punch station;

(b) providing a punch and die assembly including an outer slot punch portion and an inner slot punch portion, wherein the outer slot punch portion and the inner slot punch portion are each positionable in respective punching positions and non-punching positions;

(c) positioning one of the outer slot punch portion and the inner slot punch portion in its respective punching position and positioning the other of the outer slot punch portion and the inner slot punch portion in its respective non-punching position, and performing a first series of punching operations on one of an inner portion and an outer portion of the lamination blank forming a first pattern of spaced notches in the lamination blank;

(d) reversing the punching and non-punching positions of the outer slot punch portion and the inner slot punch portion, and performing a second series of punching operations on the other of the inner portion and the outer portion of the lamination blank forming a second pattern of spaced notches in the lamination blank.

14. The method of claim 13 comprising the further step of separating the inner lamination portion from the outer lamination portion.

15. The method of claim 14 wherein the punch and die assembly includes a separator punch portion for separating the inner lamination portion from the outer lamination portion.

16. The method of claim 15 wherein the separator punch portion is positionable in a punching position and a non-punching position, and the separator punch is in its punching position during the first series of punching operations and is in its non-punching position during the second series of punching operations.

17. The method of claim 15 wherein the separator punch portion is positionable in a punching position and a non-punching position, and the separator punch is in its punching position during the second series of punching operations and is in its non-punching position during the first series of punching operations.

* * * * *